(12) United States Patent
Streid

(10) Patent No.: US 10,778,946 B1
(45) Date of Patent: Sep. 15, 2020

(54) ACTIVE SCREEN FOR LARGE VENUE AND DOME HIGH DYNAMIC RANGE IMAGE PROJECTION

(71) Applicant: The Boeing Company, Chicago, IL (US)

(72) Inventor: Harold Reinhold Streid, St Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/672,852

(22) Filed: Nov. 4, 2019

(51) Int. Cl.
| G09G 5/02 | (2006.01) |
| H04N 9/31 | (2006.01) |
| H04N 5/57 | (2006.01) |
| G06T 5/00 | (2006.01) |
| G03B 21/62 | (2014.01) |
| G09B 9/08 | (2006.01) |

(52) U.S. Cl.
CPC ............ *H04N 9/3179* (2013.01); *G03B 21/62* (2013.01); *G06T 5/008* (2013.01); *G06T 5/009* (2013.01); *G09G 5/02* (2013.01); *H04N 5/57* (2013.01); *H04N 9/3147* (2013.01); *H04N 9/3161* (2013.01); *H04N 9/3164* (2013.01); *G06T 2207/10016* (2013.01); *G06T 2207/20208* (2013.01); *G09B 9/08* (2013.01)

(58) Field of Classification Search
CPC .......... G09G 5/02; H04N 9/3179; H04N 5/57; H04N 9/3147; H04N 9/3161; H04N 9/3164; G03B 21/62; G06T 5/008; G06T 5/009; G06T 2207/10016; G06T 2207/20208; G09B 9/08
USPC ................... 345/589, 690; 348/687
See application file for complete search history.

(56) References Cited

U.S. PATENT DOCUMENTS

| 9,584,701 | B2* | 2/2017 | Kelly | H04N 19/593 |
| 9,866,770 | B2* | 1/2018 | Colonero | H04N 5/37206 |
| 10,187,147 | B2* | 1/2019 | Aoyama | G08C 23/04 |
| 10,306,233 | B2* | 5/2019 | Damkat | H04N 19/85 |
| 10,410,567 | B2* | 9/2019 | Nakagoshi | G09G 3/2003 |
| 2011/0154426 | A1* | 6/2011 | Doser | H04N 21/84 |
|  |  |  |  | 725/118 |
| 2016/0286226 | A1* | 9/2016 | Ridge | H04N 19/50 |
| 2017/0374328 | A1* | 12/2017 | Nakagoshi | G02F 1/133528 |
| 2018/0131913 | A1* | 5/2018 | Nakagoshi | H04N 9/3108 |

(Continued)

OTHER PUBLICATIONS

Seetzen et al; High Dynamic Range display Systems; ACM Transactions on Graphics (TOG); vol. 23, Issue 3; Aug. 2004.

(Continued)

*Primary Examiner* — Trang U Tran
(74) *Attorney, Agent, or Firm* — Parsons Behle & Latimer

(57) ABSTRACT

Apparatus and methods for displaying High Dynamic Range (HDR) imagery on a large screen suitable for viewing by a large audience in theater-size venues or domed simulators or iMax-like venues. A dual modulation method of projecting onto the front of an active projection screen and an array of high intensity light (e.g., diodes) projects the most significant bits (MSB) of the image onto the back of the screen while a standard dynamic range (SDR) video projector projects the least significant bits (LSB) of the onto the front of the screen. The result is a much higher brightness image than the projector alone can produce.

22 Claims, 4 Drawing Sheets

(56) References Cited

U.S. PATENT DOCUMENTS

2019/0028722 A1\* 1/2019 Choi .................... H04N 19/186

OTHER PUBLICATIONS

Harry Streid, Shawn Stafford; High Dynamic Range in Visual Simulation for Training Applications; Interservice/Industry Training, Simulation, and Education Conference (I/ITSEC) (2016).

\* cited by examiner

ACTIVE SCREEN FOR LARGE VENUE AND DOME HIGH DYNAMIC RANGE IMAGE PROJECTION

FIELD OF THE DISCLOSURE

This disclosure relates generally to systems and methods for displaying High Dynamic Range (HDR) imagery on a screen. More particularly, this disclosure related to systems and methods for enhancing the brightness of HDR imagery displayed on a screen.

BACKGROUND

The human eye is capable of adapting to displayed information with precision over a range of 14 orders of magnitude in luminance, from bright day to starlight. Typically, visual displays (hereinafter, "screens") used in theaters, simulation and training, or the like offer a range less than 4 orders of magnitude, and their peak luminance is a tiny fraction of that of the real-world scenes being displayed or simulated.

Typically, for existing screens visual details intended to represent part of a daytime visual scene are actually rendered at luminance levels only encountered at night in the real world. The eye responds very differently at different luminance levels. In simulation and training scenarios, training fidelity may suffer when screen luminance is inappropriate for the training scenario. This lack of fidelity to real-world conditions limits the transference of training that can be achieved in a simulator and, therefore, the number of training tasks that can be performed in-simulator.

HDR has come into wide use for home entertainment and theatrical content generation. Demanding standards have been developed for capture, distribution and display of imagery that spans nearly the entire range of human visual sensitivity. Digital encoding and decoding of such HDR imagery typically requires from 10 to 12 bits, or two to four more bits than the 8 bits which were standard for video and computer graphics for many years. The home TV industry has been very successful adding this additional precision while maintaining affordability by adopting new technologies such as quantum dots, organic light emitting diodes and spatially modulated back lighting which can be easily adapted to the small format sizes common in consumer television. HDR TVs are now available in sizes up to 84 inches (diagonal). Digital cinema on the other hand has struggled to come up with an affordable method to display HDR on large screens because of the high brightness and high contrast involved. Digital Cinema projectors with laser light sources and dual modulation have been developed but have not been well accepted because of cost. There are currently no displays in between these extremes that the simulation and training industry could adopt where large screen display is required.

Other drawbacks, inconveniences, and issues for current systems and methods al so exist.

SUMMARY

Accordingly, disclosed embodiments address these and other drawbacks, inconveniences, and issues of existing systems and methods. For example, disclosed embodiments bridge the gap between existing market segments with an active screen approach that is scalable down to the high end of direct view TVs and up to moderate size theatrical venues at a cost advantage to the large and expensive, laser cannon-like HDR digital cinema projectors.

Disclosed embodiments include methods for projecting an image on a screen by processing an HDR video signal using an image processing device executing a local dimming algorithm that performs bit separation and scaling to convert the processed HDR video signal into a binary weighted digital byte to derive a separate Least-Significant-Bit (LSB) component of high spatial frequency/low brightness and a Most-Significant-Bit (MSB) component of low spatial frequency/high brightness that are scaled with a brightness weighting. The method further includes projecting an array of the LSB components of the image onto a front of a screen with a standard dynamic range (SDR) projector, and projecting an array of the MSB components of the image onto a back of the screen using a high intensity light source.

In some embodiments, deriving the LSB component includes deriving an eight bit LSB component.

In some embodiments, deriving the MSB component includes deriving a two bit MSB component, a three bit MSB component, a four bit MSB component, or, generally, an n bit MSB component where n is an integer.

In some embodiments, the high intensity light sources are light emitting diodes (LEDs), lasers, or laser diodes.

In some embodiments, the image is a video image.

Disclosed embodiments further include a system for projecting an image on a screen, the system having a screen having a front side and a back side, a SDR projector for projecting an SDR image onto the front side of the screen, a high-brightness array for projecting onto the back side of the screen, and an image processing device, configured to receive a HDR signal and execute a local dimming algorithm to perform bit separation and scaling to convert the HDR signal into a binary-weighted digital byte, to derive a separate LSB component of high spatial frequency/low brightness and a MSB component of low spatial frequency/high brightness from the HDR signal. Embodiments of the image processing device communicate the LSB component to the SDR projector for projecting the LSB component light image onto the front of the screen and communicate the MSB component to the high-brightness array for projecting the MSB component light image onto a back of the screen.

In some embodiments, the low spatial frequency of the MSB component is a multiple of the high spatial frequency LSB component selected from the series of 1, ½, ¼, . . . , 1/n, where n=even integers.

In some embodiments, the screen includes a semi-transparent screen that reflects a portion of the LSB component light image from the front side and transmits a portion of MSB component light image from the back side to the front side.

In some embodiments, the high-brightness array may be LEDs, lasers, or laser diodes.

In some embodiments, the screen may be a flat screen, a concave screen, or a convex screen.

Other embodiments are also disclosed.

Figure 1:
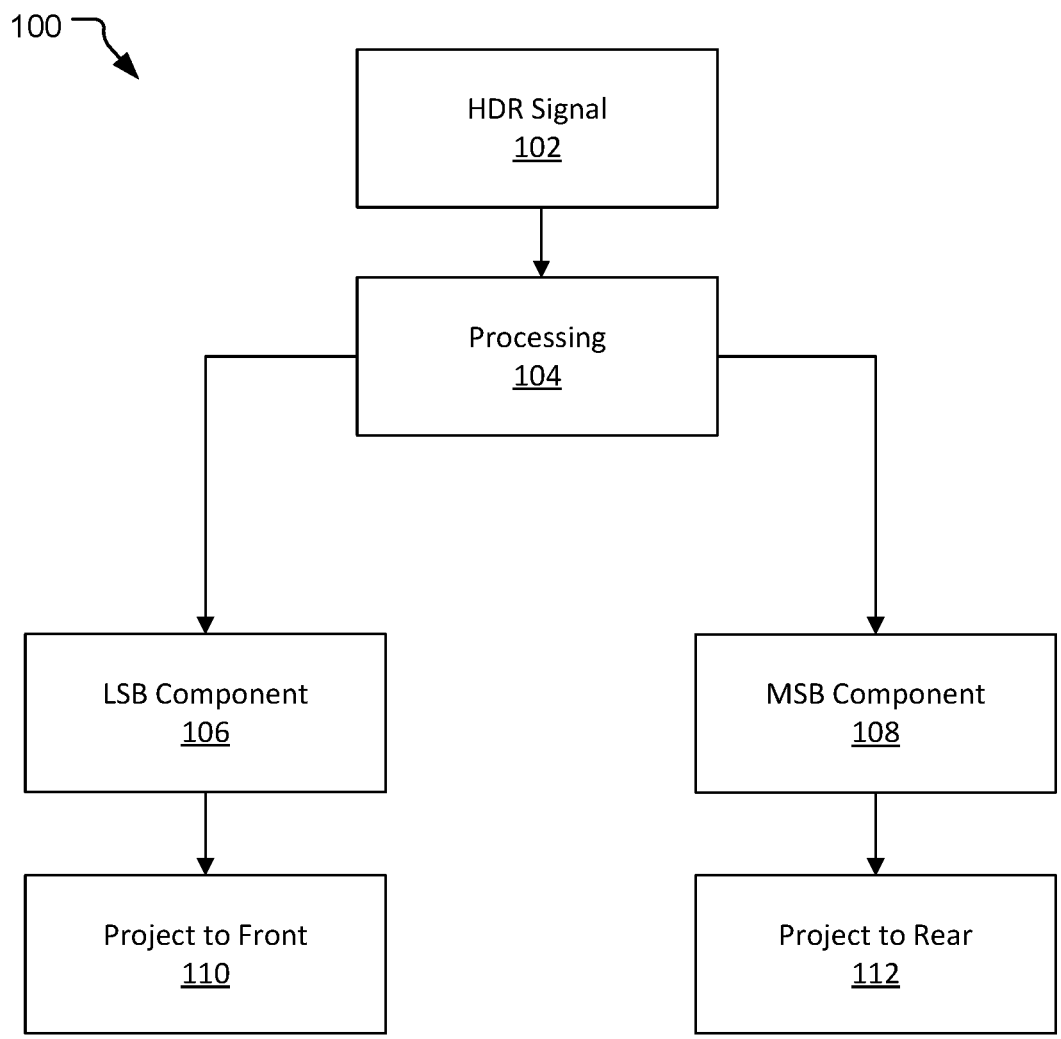
FIG. 1 is a schematic flow diagram illustrating methods of displaying HDR imagery on a screen in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic flow diagram illustrating methods 100 of displaying HDR imagery on a screen in accordance with disclosed embodiments. As indicated, method 100 may begin at step 102 by inputting an HDR signal into a processing device. Any suitable image processing device may be used to decode an HDR signal of at least 10 bits/color/pixel such as HDR10 (10 bits), Dolby Vision (up to 12 bits) or other appropriate HDR standards to a native RGB 4:4:4 video signal. Other processing devices are also possible.

At step 104 the processing device processes the HDR signal. Processing step 104 includes application of a specialized local dimming that performs amplitude and frequency separation and scaling to convert the processed HDR signal into a binary weighted digital byte that separates the HDR signal into a separate LSB component of high spatial frequency/low brightness, as shown at step 106, and a separate MSB component of low spatial frequency/high brightness, as shown at step 108. Processing step 104 includes an anti-aliasing algorithm to smooth out transitions in the high brightness MSB signal. This is accomplished by a low pass spatial filter which samples and filters the signal to remove high frequencies from the MSB portion of the signal. These high frequency components are then processed separately to appropriate amplitude and frequency scale and are added to the LSB signal. This assures that the high frequency, high amplitude components of the signal are not lost and do not produce aliasing but are reproduced in the LSB signal which is output from the step 104 processor. Step 104 also performs brightness uniformity correction to smooth out the variations in brightness produced by the high brightness zonal illuminators 210. The brightness uniformity correction is added to the LSB signal output from step 104 processor.

As indicated at steps 110 and 112, the separated LSB component and MSB component are then optically combined by projecting the LSB component onto the front side of a screen and the MSB component onto the back side of the same screen. In embodiments where the LSB component is 8 bits, a typical 8 bit per color SDR projector (or projectors) may be used to modulate the least-significant-byte of the HDR signal onto the front of the screen at high spatial resolution as indicated at step 110 and the MSB component may be projected onto the back of the screen as indicated at step 112 using, for example, a high brightness array of LED zonal illuminators, or the like, which modulate the MSB component (high brightness) end of the HDR signal at much lower spatial resolution.

Figure 2:
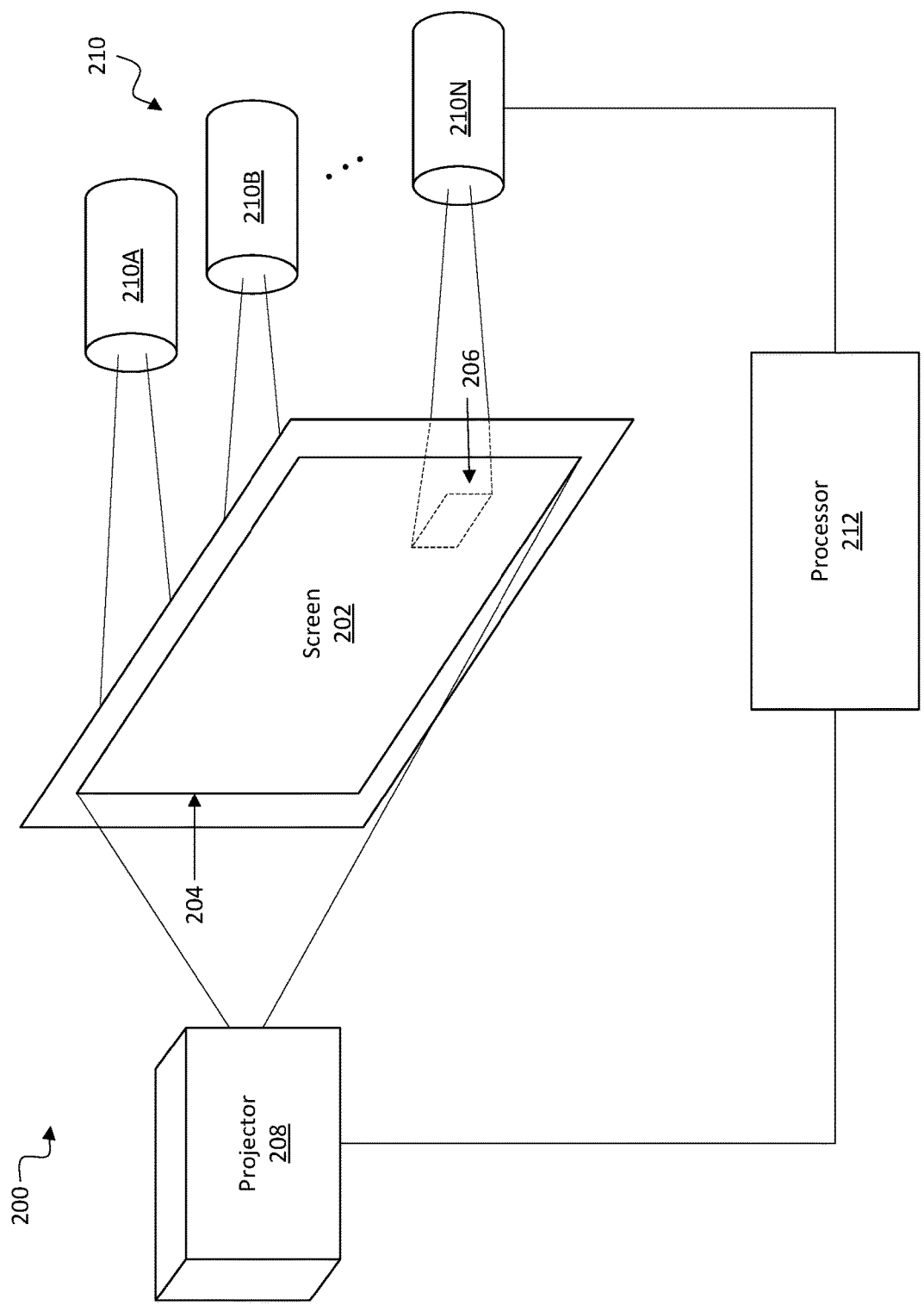
FIG. 2 is a perspective view schematic diagram of systems for displaying HDR imagery on a screen in accordance with disclosed embodiments.

FIG. 2 is a perspective view schematic diagram of systems 200 for displaying HDR imagery on a screen 202 in accordance with disclosed embodiments. As indicated, screen 202 has a front side 204 and a back side 206. While shown as generally rectangular in FIG. 2, screen 202 need not be and may be any suitable size, shape, or transparency. For example, screen 202 may be flat, concave, or convex, may be a dome-type screen as used in a flight simulator, or may be any other appropriate screen depending upon, among other things, the intended use and environment. Additionally, screen 202 is not restricted in size or shape by the availability of AMLCD panels, or the like, and can be used to create HDR displays of any size or shape including trapezoidal, toroidal or spherical.

As shown, system 200 includes one or more projectors 208. In embodiments where the LSB component is 8 bits, a typical 8 bit per color SDR projector 208 (or projectors 208) may be used to modulate the least-significant-byte of the HDR signal onto the front side 204 of the screen 202 at high spatial resolution. Other projectors 208 may also be used, which are preferably LCOS-type projectors with high contrast and low darkfield brightness characteristics.

System 200 also includes a high intensity, high brightness, light source 210 which may be a number of LED zonal illuminators (e.g., 210A-210N) or the like. Any number (N) of light sources 210 may be used. Light sources 210 may also be laser sources, laser diodes, LEDs, or the like. As disclosed herein, light source 210 is used to illuminate the back side 206 of screen 202 with the MSB component of the HDR signal.

System 200 also includes one or more image processing devices (e.g., processor 212) in communication with projector 208 and light sources 210 and to a apply the local dimming algorithm disclosed above (step 104) that performs bit separation and scaling to convert the processed HDR signal into a binary weighted digital byte that separates the HDR signal into a separate LSB component of high spatial frequency/low brightness and a separate MSB component of low spatial frequency/high brightness. Processor 212 may be a stand-alone device, may be integrated into the projector 208 or light sources 210, or may be a networked or otherwise distributed device as would be apparent to those of ordinary skill in the art having the benefit of this disclosure.

System 200 is scalable in resolution and brightness by selecting the power and density of the light sources 210 (e.g., LED zonal illuminators 210A-210N) and the resolution and brightness of the projector 208. Further, it is relatively inexpensive to mass produce system 200 in large sizes because of its use of increasingly common LED zonal illuminators (e.g., 210A-210N), low cost plastic Fresnel lenses, which may be part of the zonal illuminators 210) and commodity video projectors 208. As a result of this unique architecture the display system 200 can be scaled to a wide range of applications. It can be made larger than the typical active matrix LCD and OLED devices used for consumer television and does not require the expensive and potentially dangerous laser light sources used in HDR digital cinema projectors.

System 200 can also be adapted to existing flight simulator dome displays which commonly have projectors projecting onto a spherical front projection screen from inside the dome. By replacing the front projection dome with an active screen modulated on the back side with a spherical LED array these systems can be upgraded to high dynamic range. Applied to a curved screen a very high brightness, high dynamic range full field of view dome display for a flight simulator/aircrew trainer can be created.

Figure 3A:
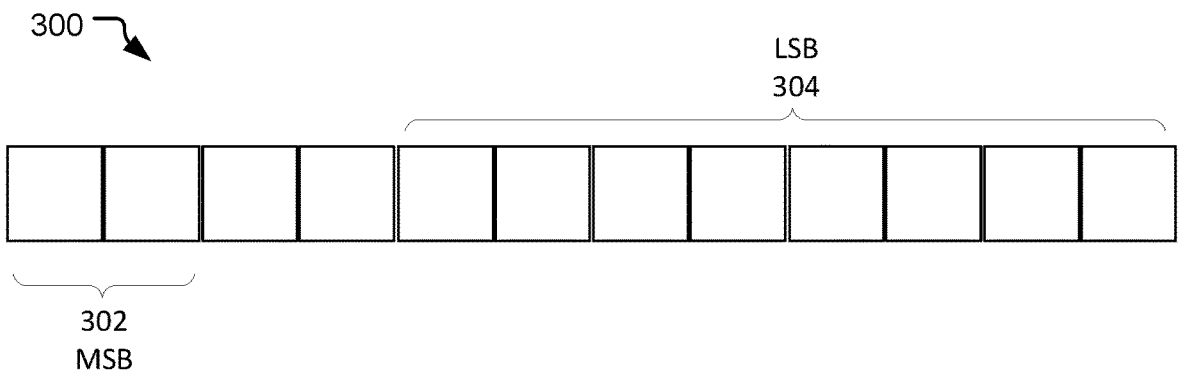
FIGS. 3A-3C are schematic diagrams representing LSB components and MSB components in accordance with disclosed embodiments.
Figure 3B:
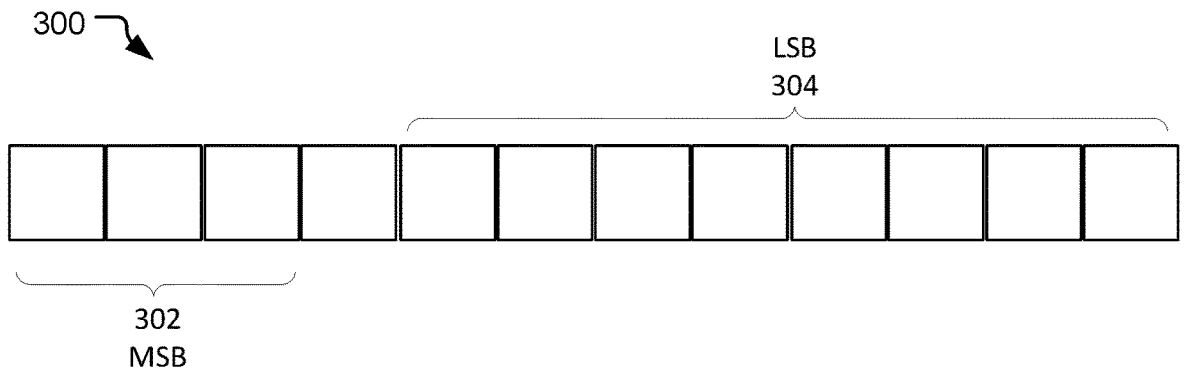
Figure 3C:
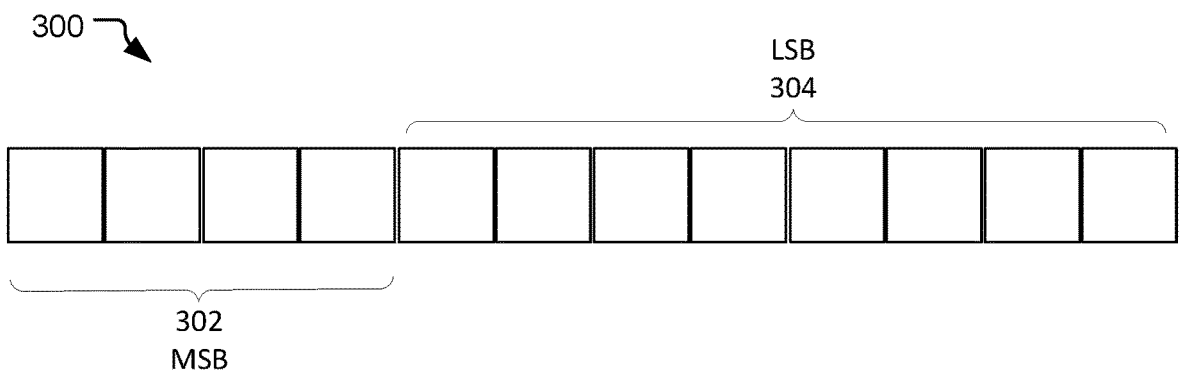

FIGS. 3A-3C are schematic diagrams representing LSB components 304 and MSB components 302 in accordance with disclosed embodiments. As disclosed herein, a digital HDR video signal 300 (shown schematically as 12 bits in FIGS. 3A-3C) is separated into an MSB component 302 and an LSB component 304. As shown, LSB component 304 may be 8 bits and MSB component 302 may be 2 bits (FIG. 3A), 3 bits (FIG. 3B), or 4 bits (FIG. 3C). For HDR signals 300 of sizes other than 12 bits other sizes for MSB component 302 and LSB component 304 may be used and may be generalized to an integer "N bit" size. Likewise, the low spatial frequency of the MSB component 302 may be a multiple of the high spatial frequency LSB component 304 selected from the series of 1, ½, ¼, . . . , 1/n, where n=even integers.

Figure 4:
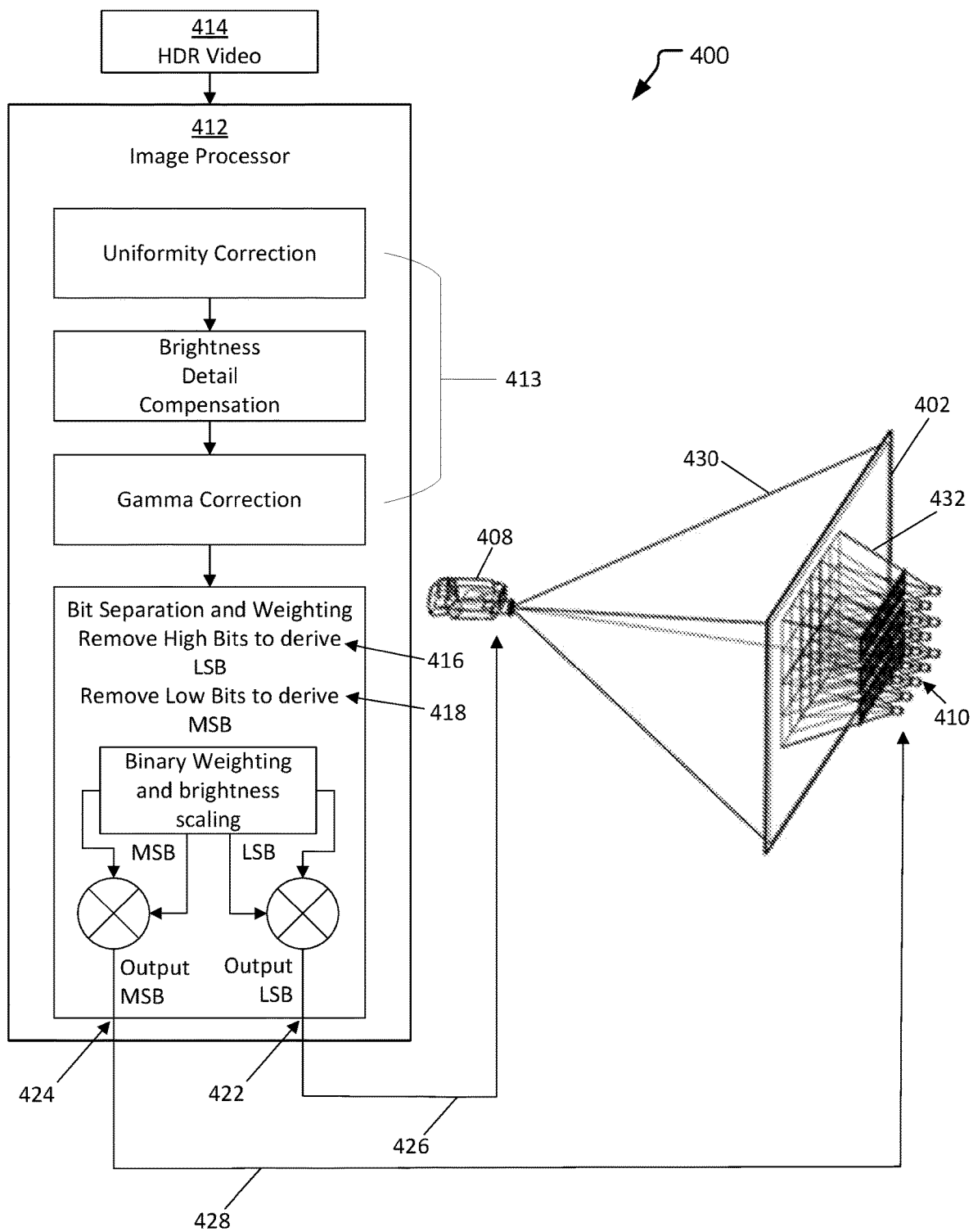
FIG. 4 is an illustration of another exemplary system and method for displaying HDR imagery on a screen in accordance with disclosed embodiments.

FIG. 4 is an illustration of another exemplary system and method for displaying HDR imagery on a screen. The system 400 includes an interface 414 for receiving an input HDR signal, such as a 10-bit or 12-bit video signal. The image processor 412, at step 416, is configured to process the input HDR signal, by removing the most significant 2 bits of a 10 bit HDR signal for example, to yield a separate 8-bit LSB component of high spatial frequency/low brightness from the input HDR signal (step 416 may be similar to 106 in FIG. 1). At step 418, the image processor 412 is configured to process the input HDR signal, by removing the least significant 2 bits of the 10 bit HDR signal for example, to yield a separate 8-bit MSB component of low spatial frequency/high brightness from the input HDR signal (step 418 may be similar to 108 in FIG. 1). As shown in FIG. 4 at step 413, the image processor 412 may further be configured to process the signal using a local dimming algorithm that is configured to perform uniformity correction (by using a high spatial frequency modulation of the processed HDR signal to correct for brightness uniformity), brightness detail compensation (by using an anti-aliasing algorithm to smooth our transitions in the high brightness processed HDR signal) and to perform Gamma correction (by using Electro-Optical Transfer Function according to standard HDR decoding). The image processor 412, at step 422, outputs the LSB component of the HDR signal via a connection 426 to a standard dynamic range projector 408 (similar to projector 208 in FIG. 2) that is configured to project the LSB component imagery onto the front of a display screen 402 (similar to screen 202 in FIG. 2). The image processor 412, at step 424, outputs the MSB component of the HDR signal via a connection 428 to a high brightness LED zonal illuminator 410 that is configured to project the MSB component imagery onto the back of the display screen 402. The separated LSB component and MSB component are then optically combined by projecting the LSB component onto the front side of the screen 402 and the MSB component onto the back side of the same screen 402, where the MSB component is the properly weighted to the light projected onto the front side of the screen. The standard dynamic range projector 408 may be a Low Dynamic Range LDR projector, for example, which at step 430, projects the LSB component imagery of high spatial frequency/low brightness onto the front of the display screen 402. The high brightness illuminator 410 may be a high brightness zonal illuminator LED projection array 410 that, at step 432, projects the MSB component imagery of low spatial frequency/high brightness onto the back of the display screen 402. In an exemplary embodiment, the system 400 is incorporated in a flight simulator display, to project the separate LSB component onto the front of a simulator display screen, and to project the separate MSB component onto the back of the simulator display screen, to provide improved display of HDR image data in a flight simulator system at a cost advantage to more expensive HDR digital projectors.

Although various embodiments have been shown and described, the present disclosure is not so limited and will be understood to include all such modifications and variations would be apparent to one skilled in the art.

What is claimed is:

1. A method for projecting an image on a screen, the method comprising:
   processing a high-dynamic range video signal using an image processing device executing a local dimming algorithm that performs bit separation and scaling to convert the processed high dynamic range video signal into a binary weighted digital byte to derive a separate Least-Significant-Bit (LSB) component of high spatial frequency/low brightness and a Most-Significant-Bit (MSB) component of low spatial frequency/high brightness that are scaled with a brightness weighting;
   projecting an array of the LSB components of the image onto a front of a screen with a standard dynamic range (SDR) projector; and
   projecting an array of the MSB components of the image onto a back of the screen using a high intensity light source.

2. The method of claim 1, wherein deriving the LSB component comprises deriving an eight bit LSB component.

3. The method of claim 1, wherein deriving the MSB component comprises deriving a two bit MSB component.

4. The method of claim 1, wherein deriving the MSB component comprises deriving a three bit MSB component.

5. The method of claim 1, wherein deriving the MSB component comprises deriving a four bit MSB component.

6. The method of claim 1, wherein deriving the MSB component comprises deriving an N bit MSB component where N is an integer.

7. The method of claim 1 wherein the high intensity light source comprises light emitting diodes (LEDs).

8. The method of claim 1 wherein the high intensity light source comprises lasers.

9. The method of claim 1 wherein the high intensity light source comprises laser diodes.

10. The method of claim 1 wherein the image is a video image.

11. A system for projecting an image on a screen, the system comprising:
   a screen having a front side and a back side;
   a standard dynamic range (SDR) projector for projecting an SDR image onto the front side of the screen;
   a high-brightness array for projecting onto the back side of the screen; and
   an image processing device, configured to receive a high-dynamic range (HDR) signal and execute a local dimming algorithm to perform bit separation and scaling to convert the HDR signal into a binary-weighted digital byte, to derive a separate Least-Significant-Bit (LSB) component of high spatial frequency/low brightness and a Most-Significant-Bit (MSB) component of low spatial frequency/high brightness from the HDR signal;
   the image processing device further configured to communicate the LSB component to the SDR projector for projecting the LSB component light image onto the front of the screen; and to communicate the MSB component to the high-brightness array for projecting the MSB component light image onto a back of the screen.

12. The system of claim 11, wherein the low spatial frequency of the MSB component is a multiple of the high spatial frequency LSB component selected from the series of 1, ½, ¼, . . . , 1/n, where n=even integers.

13. The system of claim 11, wherein the screen comprises:
a semi-transparent screen that reflects a portion of the LSB component light image from the front side.

14. The system of claim 11, wherein the screen comprises:
a semi-transparent screen that transmits a portion of MSB component light image from the back side to the front side.

15. The system of claim 11 wherein the high-brightness array comprises light emitting diodes (LEDs).

16. The system of claim 11 wherein the high-brightness array comprises lasers.

17. The system of claim 11 wherein the high-brightness array comprises laser diodes.

18. The system of claim 11 wherein the image projected onto the screen is a video image.

19. The system of claim 11 wherein the screen comprises a flat screen.

20. The system of claim 11 wherein the screen comprises a concave screen.

21. The system of claim 11 wherein the screen comprises a convex screen.

22. The system of claim 11 wherein the LSB component comprises an eight bit LSB component.

* * * * *